US008817593B2

(12) United States Patent
Shieh et al.

(10) Patent No.: US 8,817,593 B2
(45) Date of Patent: *Aug. 26, 2014

(54) METHOD AND APPARATUS PROVIDING FAILOVER FOR A POINT TO POINT TUNNEL FOR WIRELESS LOCAL AREA NETWORK SPLIT-PLANE ENVIRONMENTS

(75) Inventors: Shu Ching Shieh, Nashua, NH (US); Mohnish Anumala, Littleton, MA (US); Alexandros Moisiadis, Stow, MA (US); Debin Zhang, Littleton, MA (US); Lawrence James DiBurro, Haverhill, MA (US)

(73) Assignee: Avaya Inc., Basking Ridge, NJ (US)

( * ) Notice: Subject to any disclaimer, the term of this patent is extended or adjusted under 35 U.S.C. 154(b) by 812 days.

This patent is subject to a terminal disclaimer.

(21) Appl. No.: 12/917,059

(22) Filed: Nov. 1, 2010

(65) Prior Publication Data

US 2012/0110393 A1    May 3, 2012

(51) Int. Cl.
*G06F 11/00* (2006.01)
*H04L 29/14* (2006.01)
*H04L 29/06* (2006.01)
*H04L 12/56* (2006.01)

(52) U.S. Cl.
CPC .............. *H04L 45/22* (2013.01); *H04L 69/40* (2013.01); *H04L 2212/0025* (2013.01); *H04L 45/46* (2013.01); *H04L 45/28* (2013.01); *H04L 69/14* (2013.01); *H04L 45/245* (2013.01); *Y02B 60/33* (2013.01)
USPC ............................ 370/217; 370/221; 370/242

(58) Field of Classification Search
None
See application file for complete search history.

(56) References Cited

U.S. PATENT DOCUMENTS

| 2005/0007951 | A1* | 1/2005 | Lapuh et al. ................. 370/225 |
| 2006/0069946 | A1* | 3/2006 | Krajewski et al. ............... 714/6 |
| 2011/0038255 | A1* | 2/2011 | Zhou et al. .................... 370/218 |

* cited by examiner

*Primary Examiner* — Jae Y Lee
*Assistant Examiner* — Tito Pham
(74) *Attorney, Agent, or Firm* — Anderson Gorecki & Rouille LLP (57) ABSTRACT

A method, apparatus and computer program product for providing failover for a point to point tunnel for wireless local area network split-plane environments is presented. A second network switch learns first data associated with a third network switch and the second network switch terminates a tunnel. The third network switch learns second data associated with the second network switch. The first and second data are synchronized between the second network switch and the third network switch. The second network switch and the third network switch load sharing tunnel data packets. The third network switch forwards tunnel control packets received by the third network switch to the second network switch. A failure relating to the second network switch is detected and a new tunnel is established with the third network switch.

17 Claims, 7 Drawing Sheets

METHOD AND APPARATUS PROVIDING FAILOVER FOR A POINT TO POINT TUNNEL FOR WIRELESS LOCAL AREA NETWORK SPLIT-PLANE ENVIRONMENTS

BACKGROUND

Data communication networks may include various computers, servers, nodes, routers, switches, hubs, proxies, and other devices coupled to and configured to pass data to one another. These devices are referred to herein as "network elements," and may provide a variety of network resources on a network. Data is communicated through data communication networks by passing protocol data units (such as packets, cells, frames, or segments) between the network elements over communication links on the network. A particular protocol data unit may be handled by multiple network elements and cross multiple communication links as it travels between its source and its destination over the network. Hosts such as computers, telephones, cellular telephones, Personal Digital Assistants, and other types of consumer electronics connect to and transmit/receive data over the communication network and, hence, are users of the communication services offered by the communication network.

Network switches (e.g. Access Points, Mobility Switches and Edge Switches) are typically implemented to have a control plane that controls operation of the network element and a data plane that handles traffic flowing through the network. The data plane typically will have a collection of line cards having ports that connect to links on the network. Data is received at a particular port, switched within the data plane, and output at one or more other ports onto other links on the network. To enable the data to be handled quickly, the data plane is typically implemented in hardware so that all of the decisions as to how to handle the data are performed using hardware lookups, etc. The packets are transferred across the network in accordance with a particular protocol, such as the Internet Protocol (IP).

Ports can fail for many reasons, including line card failure, failure of the link connected to the port (e.g. line cut), far-end line card failure, etc. Likewise, the internal forwarding datapath within the network element may fail which may cause a port or set of ports to appear to have failed, or there may be some other failures along the logical/virtual connection to the port's external peer endpoint. There are numerous reasons why a port may fail.

In the event a port fails, traffic flowing through the port should be diverted to flow out an alternate port to enable connectivity to be restored through the network. To minimize impact on the traffic being handled by the network element, e.g. to minimize downtime and packet loss, the quicker the rerouting of traffic can occur the better. Preferably, it would be advantageous to enable the traffic to fail over to an alternate port in under ten milliseconds (ms). Preferably, the traffic should be spread across the remaining ports rather than all moved from the failing port to a particular designated alternate port to prevent the designated alternate port from being overloaded with traffic.

The current "network overlay" model of integrating Wireless networks with the wired network infrastructure has drawbacks that are alleviated with a newer design called Wireless LAN Split-Plane architecture. In this architecture the basic data forwarding function is pulled out of the Wireless Switches and is incorporated into the existing routing switches, thus minimizing the monetary cost and network management headaches for enterprise networks. In such deployments, the Access Point device that performs the wireless signaling to the mobile units, is connected via a point-to-point tunnel to one member of a pair of routing switches that form a Routed Split Multi-Link Trunking (RSMLT) system. RSMLT clusters are used traditionally in networks in order to provide resiliency, redundancy and fast traffic recovery when links are severed or a switch goes out of service.

Over time, the manner in which network elements handle data has evolved. For example, two or more physical links may extend between a group of network elements and be used collectively as a multi-link trunk (MLT). When the links of an MLT are physically connected to two different network elements, the MLT is referred to as a Split Multi-Link Trunk (SMLT). In particular, each of the links in the MLT may be used by either of the network elements to forward data to the other. Thus, if a first network element has data (e.g., a frame/packet) to send to a second network element, the first network element may select one of the links from the MLT and transmit the packet over that link to the second network element.

As noted above, depending on the manner in which the network elements are interconnected, there may be many ways for the network element to forward a frame/packet to enable the frame/packet to reach its destination. As used herein, the term "cluster" is used to refer to one or more nodes providing node-level resiliency at the network level. Logical connections between the cluster nodes are referred to herein as Inter-Switch Trunks (ISTs). Two or more links may be grouped to form a Multi-Link Trunk (MLT). Each MLT will be assigned a MLT group ID (MLT-ID), which is a global value within the cluster and unique across the cluster nodes. An MLT with all its port members only on the local node is referred to as a local MLT group. An MLT group with some of its port members on the local node and the rest on one or more of the remote nodes is referred to as a Split MLT or SMLT group.

When a logical port is implemented as a MLT or SMLT, there are actually multiple physical ports that are capable of forwarding a packet to its next hop on the network. Accordingly, if one of the ports of a MLT/SMLT fails, it would be advantageous to cause the packet to be forwarded on one of the remaining ports so that the packet can traverse the network rather than being dropped. Likewise, rather than designate a primary and backup port for each port in the SMLT, it would be advantageous to load share the packets across the remaining ports of the MLT/SMLT so that the packets may be distributed across the remaining ports that are UP. According to an embodiment, this process is implemented in hardware so that the fastpath (data plane) can automatically accommodate individual and multiple port failures and automatically redirect packet traffic across the remaining ports in an equitable manner.

Wireless Local Area Network (WLAN) split-plane requires data plane or packet forwarding function of the WLAN end devices (mobility units) traffic being handled by the routing switches in the wired network rather than tunneling all the WLAN traffic to centralized controllers. These switches are called mobility switches and they are capable of terminating tunnels initiated by the WLAN access point (AP) devices. They perform the packet forwarding function for the WLAN network.

A significant number of deployments have (routed) split multi-link trunking (SMLT/RSMLT) in the distribution and core layers. (R)SMLT provides redundancy and traffic load balancing of the routing switch nodes. Typical WLAN split plane deployment in a customer network will prefer the mobility switch function be performed by a routing switch in the distribution or core layers. This essentially requires interworking between WLAN split plane and RSMLT.

RSMLT provides resiliency to the network. WLAN split plane is a unique solution to converge the wired and wireless networks. In these converged networks, wired network resiliency capabilities should be extended to the WLAN networks, and in particular to WLAN point to point tunnels.

SUMMARY

In a world where communications and permanent connectivity of devices to the Internet have become the norm, loss of connectivity and jitter are becoming unacceptable. This requires networks to provide as fast recovery as possible and as small traffic loss as can possibly be allowed. The Virtual Router Redundancy Protocol (VRRP) and its newer incarnation VRRPv3 provide a level of resiliency and recovery from loss which may be acceptable for small networks or applications that are not time critical. VRRPv3 does not address the special issues raised in the case of point to point tunnels like the ones created in a Wireless LAN Split-plane network architecture where additional protocol dependencies come into play.

The current "network overlay" model of integrating Wireless networks with the wired network infrastructure has drawbacks that are alleviated with a newer design called Wireless LAN Split-Plane architecture. In this architecture the basic data forwarding function is pulled out of the Wireless Switches and is incorporated into the existing Routing switches, thus minimizing the monetary cost and network management headaches for Enterprise networks. In such deployments, the Access Point device that performs the Wireless signaling to the Mobile units, is connected via a point-to-point tunnel to one member of a pair of Routing switches that form a Routed Split Multi-Link Trunking (RSMLT) system. RSMLT clusters are used traditionally in networks in order to provide resiliency, redundancy and fast traffic recovery when links are severed or a switch goes out of service.

Conventional mechanisms such as those explained above suffer from a variety of deficiencies. The conventional manner for providing load-sharing services is the VRRP protocol and its different incarnations. In the VRRP case configuration is required in order to perform load sharing. When a link is severed or when the VRRP master switch stops functioning, VRRP on the still active peer depends on timers per interface in order to perform the switch over, which overloads the system as the number of interfaces increases and the timers have short timeouts thus hindering the quick recovery.

Another deficiency associated with conventional RSMLT environments occurs when the wireless tunnel on the SMLT peer failover to the backup SMLT peer, the backup SMLT peer would resume the wireless tunnel traffic forwarding on behave of its peer for a period of SMLT hold-up time. However, since the tunnel control session does not failover, eventually the Access Point would detect the disruption of the tunnel control, and then tears down the Access Tunnel before it re-establish a new wireless tunnel connection with the other mobility switch. This service disruption would happen even the SMLT mobility switches have provided the seamless failover for the tunnel data forwarding.

It is therefore desirable to extend the RSMLT in order to provide load-sharing and resiliency services to networking topologies that include tunneling. None of the aforementioned cases deals with providing redundancy, load sharing, and quick recovery in the case of WLAN Split-plane Access Tunnels.

Embodiments of the invention significantly overcome such deficiencies. By way of the presently described method and apparatus for performing failover for point to point tunnels, during the establishment of the wireless tunnel, the Split Multi-link Trunking (SMLT) Mobility Switch (peer-1) would communicate to the Access Point its capability of graceful failover. So when Access Point detects the disruption of the tunnel session due to the SMLT failover, the Access Point would preserve all the tunnel forwarding states intact, and continue forwards the wireless traffic out to the same interface using the same tunnel encapsulation. Due to the SMLT setup, the traffic would be forwarded to the other SMLT Mobility Switch (peer-2) which is completely capable to handle and process the data traffic on behave of its SMLT peer (peer-1). The Access Point would re-establish a new tunnel connection to the other SMLT Mobility Switch (peer-2). Once the new Access Tunnel is established successfully, all the wireless traffic then starts to take the ride onto the new access tunnel with the new tunnel header encapsulations.

To improve the convergency of the switchover, the SMLT Mobility Switch (peer-2) can also notify the Access Point of the SMLT tunnel failover when it detects its SMLT peer goes down, so that the Access Point can proceed to perform graceful switchover by re-establishing a new Access Tunnel connection to the active Mobility Switch (peer-2) immediately without waiting until detecting the disruption of the tunnel connection.

For the load balance and tunnel redistribution, when the SMLT Mobility Switch comes back UP to fully active state, the graceful failover messages can be sent to the Access Point to yank the tunnel connection which is established between the Access Point and its SMLT Mobility Switch peer.

In a particular embodiment of a method for providing failover for a point to point tunnel for wireless local area network split-plane environments, the method includes learning, by a second network switch, first data associated with a third network switch wherein the second network switch and the third network switch operate concurrently and wherein the second network switch terminates an Access Tunnel (AT) established between the second network switch and first network switch. The method further includes notifying, by the second network switch, the first network switch of failover capability and learning, by the third network switch, second data associated with the second network switch. Additionally the method includes synchronizing the first and second data between the second network switch and the third network switch, wherein the data includes MAC Addresses, Internet Protocol (IP) interface addresses, Virtual Local Area Network (VLAN) associations, AT assignments and first network switch IP addresses. Further, the method includes load sharing tunnel data packets by the second network switch and the third network switch wherein when the third network switch receives tunnel data packets destined to the second network switch the third network switch acts as a tunnel endpoint and performs tunnel functions for the tunnel data packets and forwarding tunnel control packets received by the third network switch to the second network switch over an Inter Switch Trunk (IST). The method also includes detecting a failure relating to the second network switch and performing recovery actions upon the detecting a failure. The recovery actions include preserving, by the first network switch, tunnel forwarding states and continuing to forward tunnel traffic out the same interface using the same tunnel encapsulation and establishing a new AT between the first network switch and the third network switch.

Other embodiments include a non-transitory computer readable medium having computer readable code thereon for providing failover for a point to point tunnel for wireless local area network split-plane environments. The computer readable medium includes instructions for learning, by a second network switch, first data associated with a third network switch wherein the second network switch and the third network switch operate concurrently and wherein the second network switch terminates an Access Tunnel (AT) established between the second network switch and first network switch. The computer readable medium further includes instructions for notifying, by the second network switch, the first network switch of failover capability and learning, by the third network switch, second data associated with the second network switch. Additionally the computer readable medium includes instructions for synchronizing the first and second data between the second network switch and the third network switch, wherein the data includes MAC Addresses, Internet Protocol (IP) interface addresses, Virtual Local Area Network (VLAN) associations, AT assignments and first network switch IP addresses. Further, the compute readable medium includes instructions for load sharing tunnel data packets by the second network switch and the third network switch wherein when the third network switch receives tunnel data packets destined to the second network switch the third network switch acts as a tunnel endpoint and performs tunnel functions for the tunnel data packets and forwarding tunnel control packets received by the third network switch to the second network switch over an Inter Switch Trunk (IST). The computer readable medium also includes instructions for detecting a failure relating to the second network switch and performing recovery actions upon the detecting a failure. The recovery actions include preserving, by the first network switch, tunnel forwarding states and continuing to forward tunnel traffic out the same interface using the same tunnel encapsulation and establishing a new AT between the first network switch and the third network switch.

Still other embodiments include a computerized device (e.g., a network switch), configured to process all the method operations disclosed herein as embodiments of the invention. In such embodiments, the computerized device includes a memory system, a processor, communications interface in an interconnection mechanism connecting these components. The memory system is encoded with a process that provides failover for a point to point tunnel for wireless local area network split-plane environments as explained herein that when performed (e.g. when executing) on the processor, operates as explained herein within the computerized device to perform all of the method embodiments and operations explained herein as embodiments of the invention. Thus any computerized device that performs or is programmed to perform processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing failover for a point to point tunnel for wireless local area network split-plane environments as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
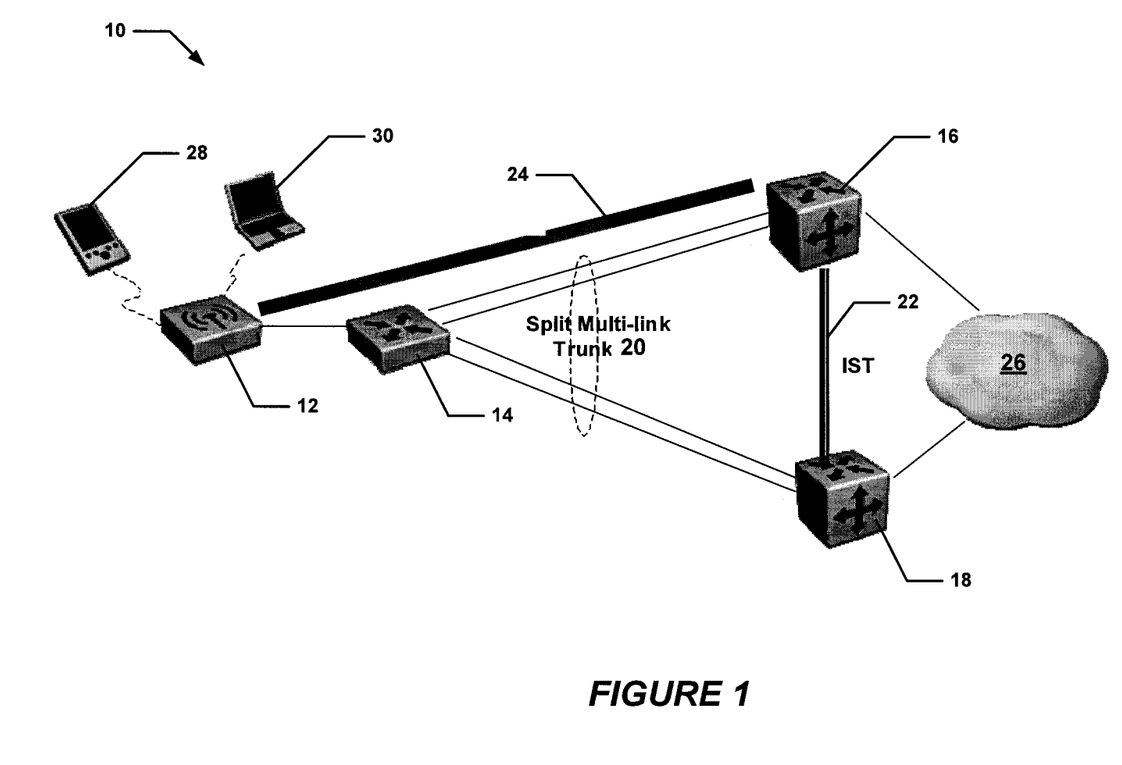
FIG. 1 depicts a network for performing Routed Split Multi-Link Trunking Resiliency for Wireless Local Area Network split-plane environments in accordance with embodiments of the invention.
Figure 2:
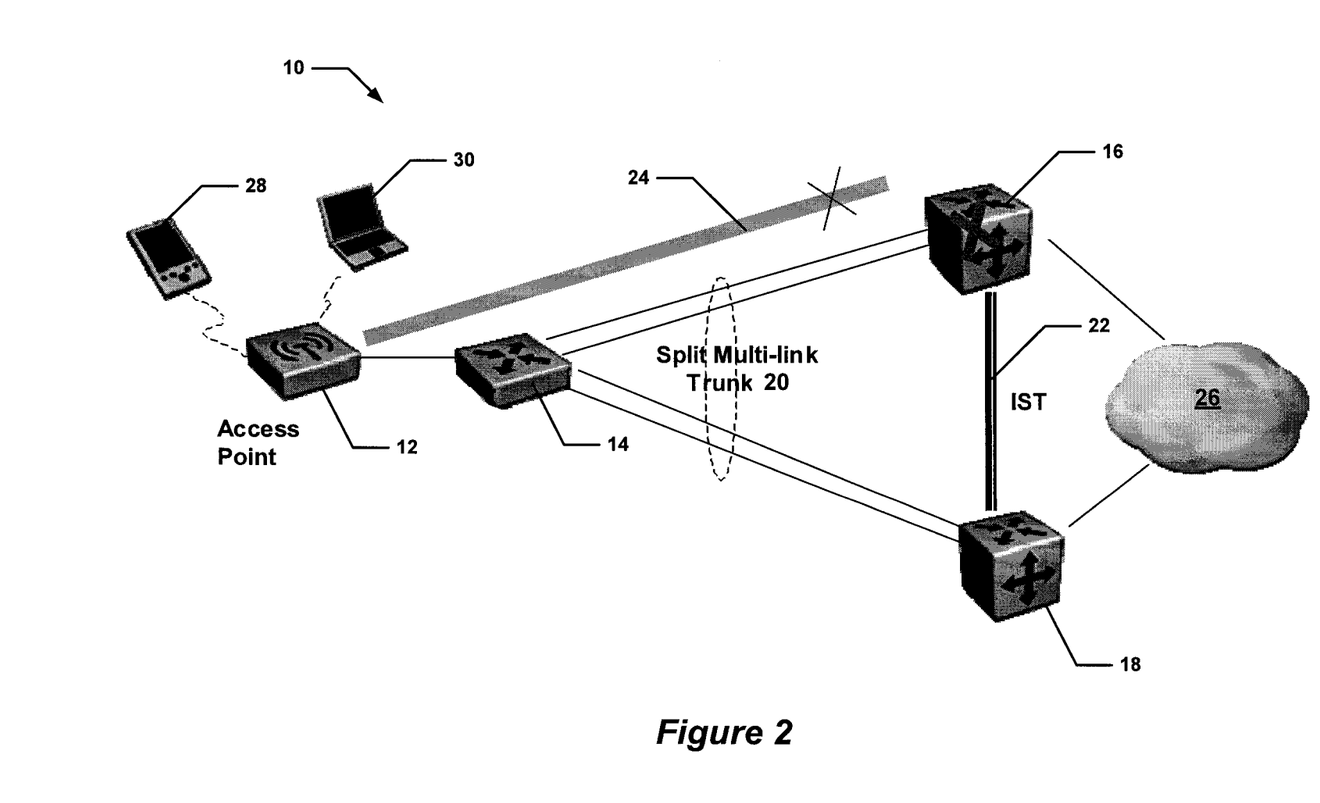
FIG. 2 depicts a network for performing Routed Split Multi-Link Trunking Resiliency for Wireless Local Area Network split-plane environments with a switch failure.
Figure 3:
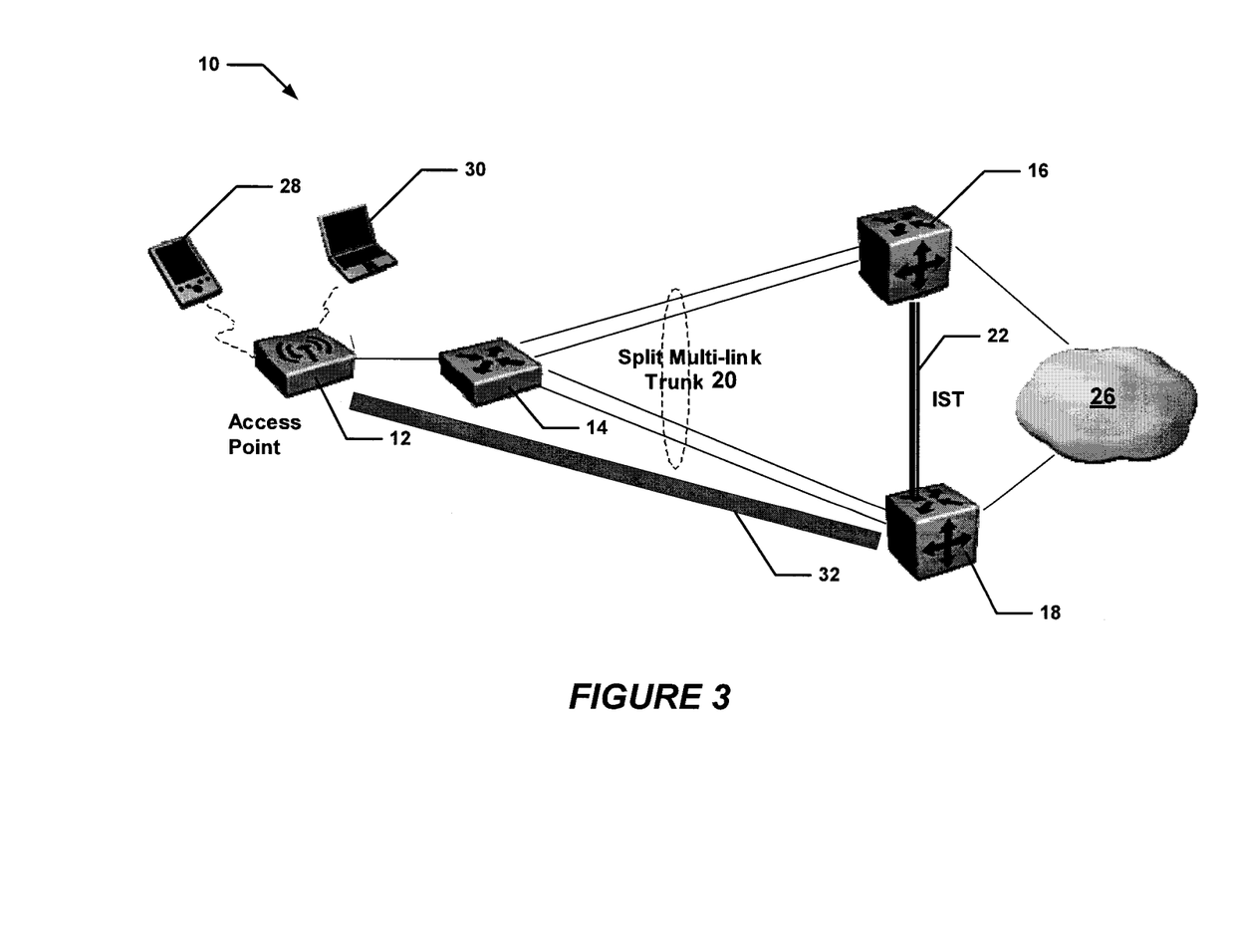
FIG. 3 depicts a network for performing Routed Split Multi-Link Trunking Resiliency for Wireless Local Area Network split-plane environments wherein a new Access tunnel is established.

Referring to FIGS. 1-3, a basic RSMLT network environment 10 is shown. The term Access Point (AP) is used interchangeably with the term first network switch, the terms second and third network switches are used interchangeable with the terms mobility switches and peers. The network environment 10 includes mobile units 28 and 30 in wireless communication with Access Point (AP) 12. Mobile unit 28 is shown as a PDA and mobile unit 30 is shown as a laptop computer although it should be appreciated that other types of mobile units may be used, such as PDAs, cellular devices and the like. first network switch 12 is in communication with Access Switch 14 which is in communication with network switch 16 and network switch 18. Network switches 16 and 18 are also referred to herein as mobility switches. Access Switch 14, network switch 16 and network switch 18 are connected to each other via a Split Multi-Link Trunk (SMLT) 20 which provides for extra bandwidth as well as redundancy. The network switches 16 and 18 are configured to run Layer 3 protocols (IPv4 family in particular) as well as an additional proprietary protocol via which they exchange information about their configuration, state, databases and link state. This latter protocol runs over the MLT connection between the two peers that form the RSMLT cluster named Inter-Switch Trunk (IST) 22. Network switch 16 and network switch 18 are peers for each other and part of a cluster. On one side the cluster is connected to the network core 26 and on the other side each peer is connected via SMLT 20 to the Access Switch 14 which is running as a Layer 2 switch and is unaware of the fact that it is connecting to two distinct systems. The Access Switch 14 performs the load-sharing function when forwarding traffic over the SMLT links which is flowing towards the network core. The two RSMLT peers in the cluster install each other's MAC addresses, ARP, IPv4 interface addresses, Access Tunnel assignments, Mobility VLAN associations and Access Point information in their own respective tables, thus making themselves capable of routing traffic destined for their peer, that due to the load-sharing function of the access switch could end up on themselves. By routing the traffic themselves as if the intended recipient, the packets avoid taking an extra hop through the network thus keeping the latency low while providing redundancy.

To provide Mobile units with connectivity to a wired network, the Access Point (AP) performs dual function at the edge of the network. On one side it provides the Radio Frequency (RF) connectivity to the mobile unit and on the other is most commonly wired to a Layer 2 Access Switch 14. The first network switch using a standards tracked protocol running over IPv4, connects to a specialized system called the Wireless Controller (WC) (not shown) which carries all the information regarding the switches that serve particular sub-networks (Mobility VLANs). The WC provides the first network switch 12 with the IPv4 address of the system which will serve as its entrance to the network and this is commonly one of the two peers in the RSMLT cluster. The AP 12 contacts its network server and a tunnel is formed, called Access Tunnel (AT) 24 between the two switches 12 and 16 which flows through the Layer2 Switch 14 and will serve as the conduit for traffic initiated or destined to all the mobile units 28 and 30 served by this Access Point 12. Control traffic regarding the Access Tunnel 24 is always initiated or terminated by the first network switch 12 and the RSMLT cluster node 16 that the first network switch has chosen to be its server, whereas data traffic is actually serviced by both cluster peers 16 and 18, as if the tunnel 24 had two end-servers. This is achieved by the cluster peers 16 and 18 exchanging the tunnel identification and the AP's IPv4 address. On the RSMLT cluster side, the tunnel space is divided between the two peers 16 and 18 in order to avoid assignment collisions when cluster peers restart after failure, by letting the RSMLT cluster peer with the IP address having higher numerical value when viewed as a single number assign odd numbered tunnels and the one with lower numerically IP address assign even numbered tunnels. The network switch 16 notifies the Access Point 12 of its failover capability.

During normal operation, traffic from the mobile unit 28 and or 30 is captured by the Access Point 12 which encapsulates it in a CAPWAP header and sends it via the Access Tunnel 24 to the RSMLT cluster switch 16 that is the tunnel termination. Due to the load sharing functionality of the Access Switch 14 sitting between the two end-points of the tunnel, the traffic is split between the two peers 16 and 18, but regardless of the original intended recipient, the actual recipient decapsulates the packets and routes them through the network core 26. This is achieved by having both peers exchange their respective MAC addresses, IPv4 interface addresses and the VLAN associations, Access Tunnel assignments and their respective first network switch IPv4 address and the fact that each cluster member marks in its hardware its peer's MAC address as an own address. Tunnel related control traffic between the first network switch 12 and the tunnel terminal member of the cluster 16, is always forwarded to and processed by the actual cluster member 16 that is the tunnel owner even if the traffic takes an extra hop via its cluster peer 18 due to the load sharing actions of Access Switch 14.

Referring now to FIGS. 2 and 3, when the first network switch 12 realizes that the tunnel's cluster owner 16 is not responding to the tunnel control packets or the first network switch 12 is notified by third network switch 18 that network switch 16 is unavailable, the first network switch 12 preserves tunnel forwarding states and continues to forward tunnel traffic out the same interface and using the same tunnel encapsulation. This is done for a predetermined amount of time, referred to as RSMLT hold up time, in order that a new tunnel can be established with the peer before the original tunnel is torn down. The first network switch 12 then establishes a new access tunnel 32 with the still active third network switch 18 and redirects all traffic via this new tunnel 32. In a similar fashion the third network switch 18 switches over the traffic intended for the first network switch 12 via the newly formed tunnel 32.

The presently described method for providing failover for a point to point tunnel for wireless local area network split-plane environments provides three basic services. These services are redundancy of links and switches (nodes), load-sharing, and fast recovery in case of loss of link or switch for WLAN traffic over a tunnel to and from an Access Point wireless device.

Load sharing comes for free since it is actually performed by the Layer 2 switch connecting to the two RSMLT cluster switches via a MLT. In the RSMLT case (as opposed to the earlier described VRRP technique) the switch over is almost instant due to the fact that there is no timer dependency and the two peers in the cluster always forward routed traffic regardless of which one was the intended gateway.

Figure 4:
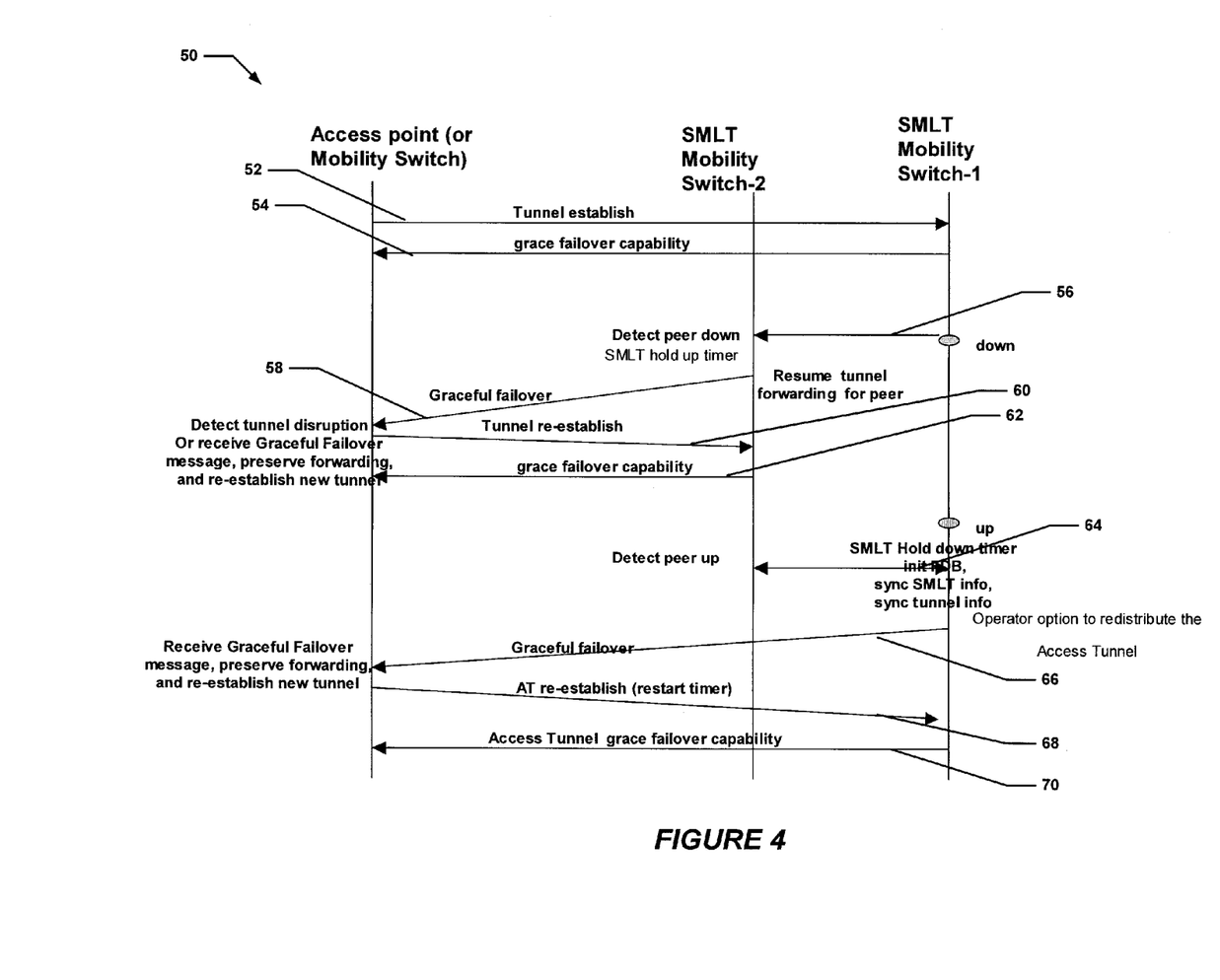
FIG. 4 comprises a timing diagram for providing failover for a point to point tunnel for wireless local area network split-plane environments in accordance with embodiments of the invention.

Referring now to FIG. 4, a timing diagram 50 is shown for performing the operations used in providing failover for a point to point tunnel for wireless local area network split-plane environments. At time 52 an AT is established between the first network switch and a second network switch. Shortly thereafter, at time 54, second network switch notifies the first network switch that that is capable of performing tunnel failover. At time 56 a failure is detected related to the second network switch. At time 58, a failover message is received at the first network switch from the third network switch. At time 60 a new access tunnel is established between the first network switch and the third network switch. At time 62 the third network switch notifies the first network switch that is capable of performing tunnel failover.

In some situations the failed network switch (second network switch in this example) may come back up to a fully active state, shown a time 64. If load balance is the intention of the configuration of the RSMLT peers, second network switch would send a tunnel switchover message to Access Point. At time 66 the first network switch receives the tunnel failover message, and preserves forwarding. At time 68 the first network switch reestablishes a new tunnel with a second network switch. At times 70, the second network switch notifies the first network switch that is capable of performing tunnel failover. This only happens when the SMLT are configures to perform load balance.

FIGS. 1-4 were described with respect to an Access Point and an Access Tunnel, it should be appreciated that the same concepts apply to mobility tunnels established between mobility switches.

Figure 5A:
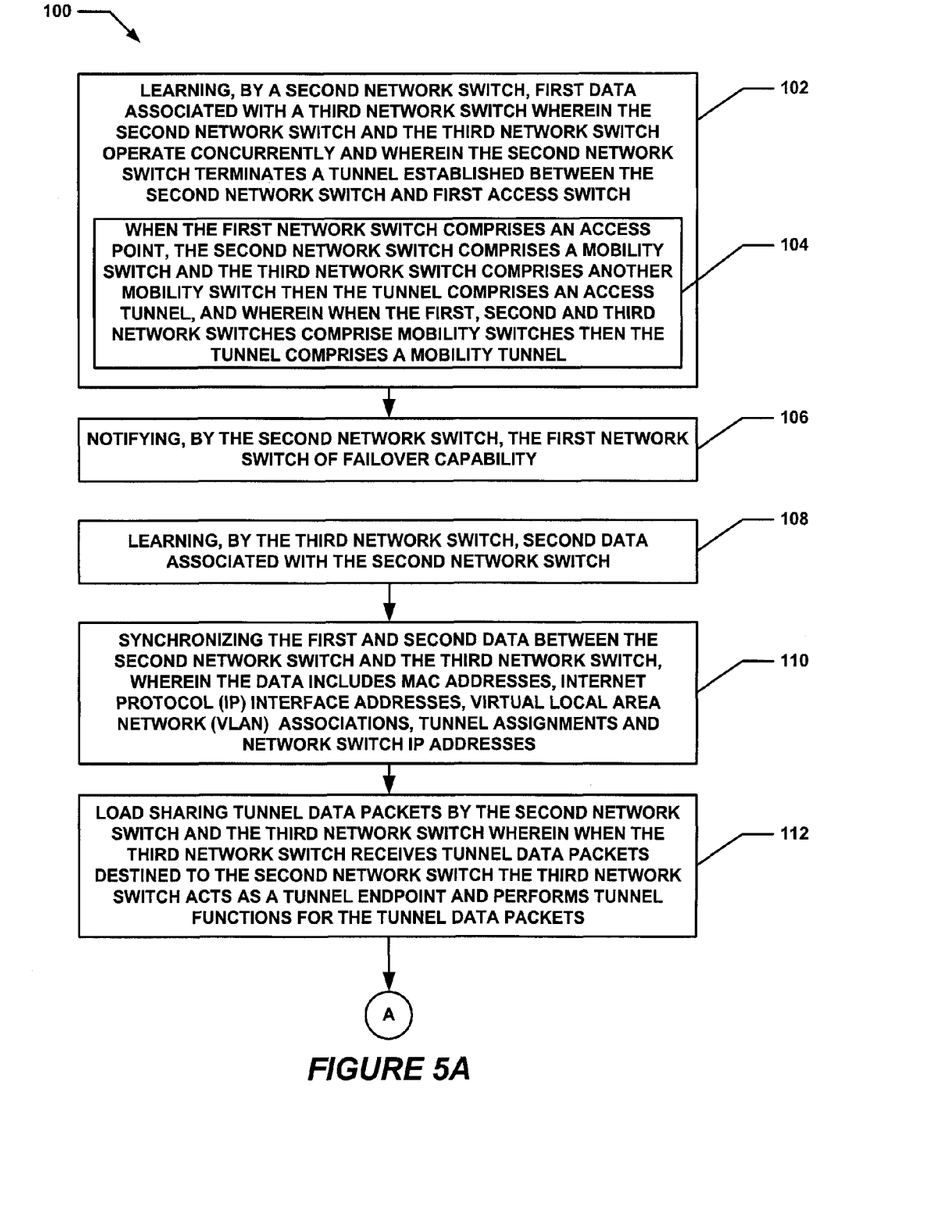
FIGS. 5A and 5B depict a flow diagram for a particular method for providing failover for a point to point tunnel for wireless local area network split-plane environments in accordance with embodiments of the invention.
Figure 5B:
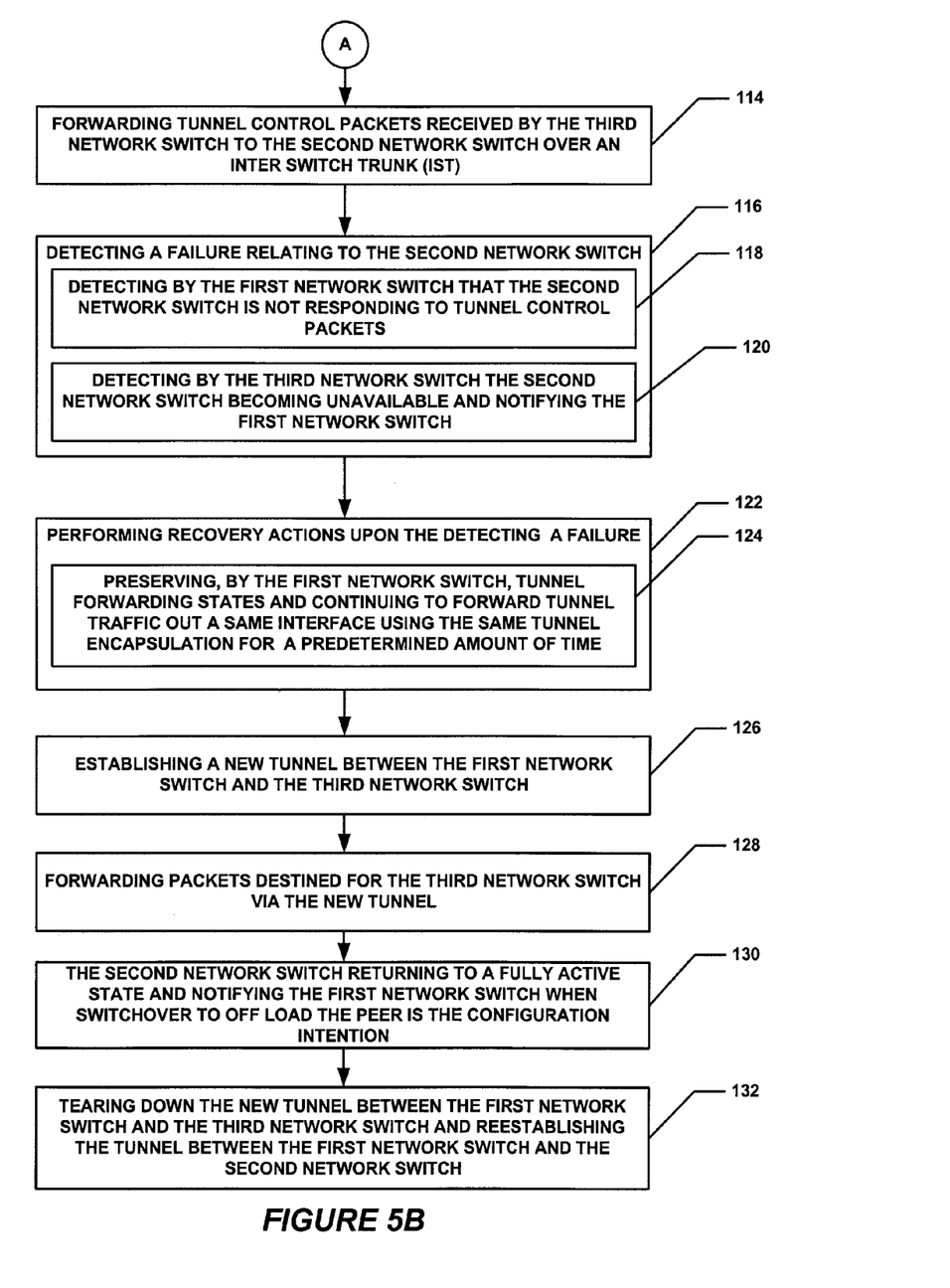

FIGS. 5A and 5B depict a flow diagram for a particular method for providing failover for a point to point tunnel for wireless local area network split-plane environments in accordance with embodiments of the invention. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 5A and 5B, a particular embodiment of a method 100 failover for a point to point tunnel for wireless local area network split-plane environments is shown. Method 100 begins with processing block 102 which discloses learning, by a second network switch, first data associated with a third network switch, wherein the second network switch and the third network switch operate concurrently and wherein the second network switch terminates a tunnel established between a first network switch and a second network switch. As shown in processing block 104 in one embodiment when the first network switch comprises an Access Point, the second network switch comprises a mobility switch and the third network switch comprises a third mobility switch and the tunnel comprises an access tunnel, alternately, in another embodiment the first, second and third network switches comprise mobility switches and the tunnel comprises a mobility tunnel.

Processing block 106 discloses notifying, by the second network switch the first network switch of failover capability. Processing block 108 recites learning, by the third network switch, second data associated with the second network switch.

Processing block 110 discloses synchronizing the first and second data between the second network switch and the third network switch, wherein the data includes MAC Addresses, Internet Protocol (IP) interface addresses, Virtual Local Area Network (VLAN) associations, tunnel assignments and first network switch IP addresses.

Processing block 112 states load sharing tunnel data packets by the second network switch and the third network switch wherein when the third network switch receives tunnel data packets destined to the second network switch the third network switch acts as a tunnel endpoint and performs tunnel functions for the tunnel data packets. Processing block 114 recites forwarding tunnel control packets received by the third network switch to the second network switch over the IST.

Processing continues with processing block 116 which discloses detecting a failure relating to the second network switch. As shown in processing block 118, the detecting comprises detecting by the first network switch that the second network switch is not responding to tunnel control packets. Alternately, as shown in processing block 120, the detecting comprises detecting by the third network switch that the second network switch has become unavailable.

Processing block 122 states performing recovery actions upon the detecting a failure. As shown in processing block 124 performing recovery actions includes preserving by the first network switch, tunnel forwarding states and continuing to forward tunnel traffic out the same interface using the same tunnel encapsulation for a predetermined period of time.

Processing block 126 recites establishing a new tunnel between the first network switch in the third network switch. Processing block 128 discloses forwarding packets destined for the third network switch via the new tunnel. Processing block 130 states the second network switch returning playfully active state in notifying the first network switch. Processing block 132 recites reestablishing a tunnel between the first network switch and the second network switch, and tearing down the tunnel between the first network switch and the third network switch, if switchover for load balance is the configuration intention.

Figure 6:
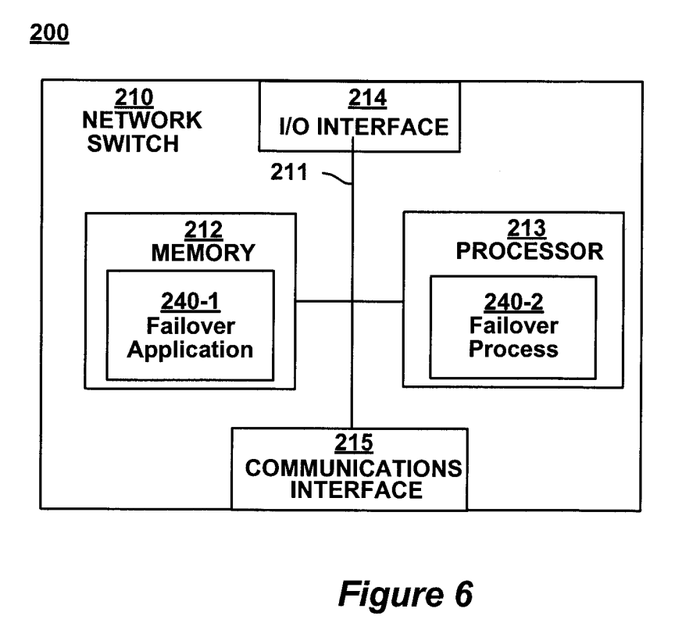
FIG. 6 illustrates an example network switch architecture for a device that provides failover for a point to point tunnel

FIG. 6 is a block diagram illustrating example architecture of a computer system (e.g. a network switch) 210 that executes, runs, interprets, operates or otherwise performs failover for a point to point tunnel for wireless local area network split-plane environments (failover application 240-1) and failover for a point to point tunnel for wireless local area network split-plane environments (failover process 240-2) suitable for use in explaining example configurations disclosed herein. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a Failover application 240-1 as explained herein. The Failover application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a Failover application 240-1. Execution of a Failover application 240-1 in this manner produces processing functionality in the Failover process 240-2. In other words, the Failover process 240-2 represents one or more portions or runtime instances of a Failover application 240-1 (or the entire a Failover application 240-1) performing or executing within or upon the processor 213 in the computerized device 210 at runtime.

It is noted that example configurations disclosed herein include the Failover application 240-1 itself (i.e., in the form of un-executed or non-performing logic instructions and/or data). The Failover application 240-1 may be stored on a computer readable medium (such as a floppy disk), hard disk, electronic, magnetic, optical, or other computer readable medium. A Failover application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a Failover application 240-1 in the processor 213 as the Failover process 240-2. Those skilled in the art will understand that the computer system 210 may include other processes and/or software and hardware components, such as an operating system not shown in this example.

During operation, processor 213 of computer system 200 accesses memory system 212 via the interconnect 211 in order to launch, run, execute, interpret or otherwise perform the logic instructions of the Failover application 240-1. Execution of Failover application 240-1 produces processing functionality in Failover process 240-2. In other words, the Failover process 240-2 represents one or more portions of the Failover application 240-1 (or the entire application) performing within or upon the processor 213 in the computer system 200.

It should be noted that, in addition to the Failover process 240-2, embodiments herein include the Failover application 240-1 itself (i.e., the un-executed or non-performing logic instructions and/or data). The Failover application 240-1 can be stored on a computer readable medium such as a floppy disk, hard disk, or optical medium. The Failover application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of Failover application 240-1 in processor 213 as the Failover process 240-2. Those skilled in the art will understand that the computer system 200 can include other processes and/or software and hardware components, such as an operating system that controls allocation and use of hardware resources associated with the computer system 200.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
    learning, by a second network switch, first data associated with a third network switch wherein said second network switch and said third network switch operate concurrently and wherein said second network switch terminates a tunnel established between said second network switch and first access switch;
    notifying, by said second network switch, said first network switch of failover capability;
    learning, by said third network switch, second data associated with said second network switch;
    synchronizing said first and second data between said second network switch and said third network switch, wherein said data includes MAC Addresses, Internet Protocol (IP) interface addresses, Virtual Local Area Network (VLAN) associations, tunnel assignments and network switch IP addresses; and
    load sharing tunnel data packets by said second network switch and said third network switch wherein when said third network switch receives tunnel data packets destined to said second network switch said third network switch acts as a tunnel endpoint and performs tunnel functions for said tunnel data packets;
    forwarding tunnel control packets received by said third network switch to said second network switch over an Inter Switch Trunk (IST); and
    detecting a failure relating to said second network switch wherein said detecting a failure relating to said second network switch further comprises performing recovery actions upon said detecting a failure and wherein said performing recovery actions comprises preserving, by said first network switch, tunnel forwarding states and continuing to forward tunnel traffic out the same interface using the same tunnel encapsulation for a predetermined amount of time.

2. The method of claim 1 wherein said detecting a failure comprises detecting by said first network switch that said second network switch is not responding to tunnel control packets.

3. The method of claim 1 wherein said detecting a failure comprises detecting by said third network switch said second network switch becoming unavailable and notifying said first network switch.

4. The method of claim 1 further comprising establishing a new tunnel between said first network switch and said third network switch.

5. The method of claim 4 further comprising forwarding packets destined for said third network switch via said new tunnel.

6. The method of claim 5 further comprising said second network switch returning to a fully active state and notifying said first network switch when switchover to off load the peer is the configuration intention.

7. The method of claim 5 further comprising tearing down said new tunnel between said first network switch and said third network switch and reestablishing a new tunnel between the first network switch and the second network switch.

8. The method of claim 1 wherein when the first network switch comprises an Access Point, the second network switch comprises a mobility switch and the third network switch comprises another mobility switch then the tunnel comprises an access tunnel, and wherein when the first, second and third network switches comprise mobility switches then the tunnel comprises a mobility tunnel.

9. A first network switch comprising:
    a memory;
    a processor;
    a communications interface;
    an interconnection mechanism coupling the memory, the processor and the communications interface; and
    wherein the memory is encoded with an application providing failover for a point to point tunnel for wireless local area network split-plane environments, that when performed on the processor, provides a process for processing information, the process causing the network switch to perform the operations of:
    establishing a tunnel with a second network switch, wherein said second network switch is a peer of a third network switch in a Split Multi Link Trunking (SMLT) arrangement;
    receiving, by said first network switch from said second network switch, notification of failover capability;
    load sharing tunnel data packets by said second network switch and said third network switch wherein when said third network switch receives tunnel data packets destined to said second network switch said third network switch acts as a tunnel endpoint and performs tunnel functions for said tunnel data packets; and
    detecting a failure relating to said second network switch wherein said detecting a failure relating to said second network switch further comprises performing recovery actions upon said detecting a failure and wherein said performing recovery actions comprises preserving, by said first network switch, tunnel forwarding states and continuing to forward tunnel traffic out the same interface using the same tunnel encapsulation for a predetermined amount of time.

10. The first network switch of claim 9 wherein said detecting a failure comprises detecting by said first network switch that said second network switch is not responding to tunnel control packets.

11. The first network switch of claim 9 wherein said detecting a failure comprises receiving notification from said third network switch that said second network switch has become unavailable.

12. The first network switch of claim 9 wherein said first network switch establishes a new tunnel between said first network switch and said third network switch.

13. The first network switch of claim 12 wherein said first network switch forwards packets destined for said third network switch via said new tunnel.

14. The first network switch of claim 13 wherein said first network switch receives notification of said second network switch returning to a fully active state when switchover to off load the peer is the configuration intention.

15. The first network switch of claim 13 wherein said first network switch establishes a newest tunnel with said second network switch, and tears down said new tunnel between said first network switch and said third network switch.

16. The first network switch of claim 9 wherein when said first network comprises an access point said tunnel comprises an access tunnel and wherein when said first network switch comprises a mobility switch said tunnel comprises a mobility tunnel.

17. A non-transitory computer readable storage medium having computer readable code thereon for providing failover for a point to point tunnel for wireless local area network split-plane environments, the medium including instructions in which a computer system performs operations comprising:
    learning, by a second network switch, first data associated with a third network switch wherein said second network switch and said third network switch operate concurrently and wherein said second network switch terminates a tunnel established between said second network switch and a first network switch;

notifying, by said second network switch, said first network switch of failover capability;

learning, by said third network switch, second data associated with said second network switch;

synchronizing said first and second data between said second network switch and said third network switch, wherein said data includes MAC Addresses, Internet Protocol (IP) interface addresses, Virtual Local Area Network (VLAN) associations, tunnel assignments and network switch IP addresses; and load sharing tunnel data packets by said second network switch and said third network switch wherein when said third network switch receives tunnel data packets destined to said second network switch said third network switch acts as a tunnel endpoint and performs tunnel functions for said tunnel data packets;

forwarding tunnel control packets received by said third network switch to said second network switch over an Inter Switch Trunk (IST); and detecting a failure relating to said second network switch wherein said detecting a failure relating to said second network switch further comprises performing recovery actions upon said detecting a failure and wherein said performing recovery actions comprises preserving, by said first network switch, tunnel forwarding states and continuing to forward tunnel traffic out the same interface using the same tunnel encapsulation for a predetermined amount of time.

* * * * *